(12) United States Patent
Ozaki (10) Patent No.: US 9,106,309 B2
(45) Date of Patent: *Aug. 11, 2015

(54) VEHICULAR COMMUNICATION SYSTEM, VEHICULAR COMMUNICATION APPARATUS AND PORTABLE TERMINAL APPARATUS

(71) Applicant: DENSO CORPORATION, Kariya, Aichi-pref. (JP)

(72) Inventor: Yoshitaka Ozaki, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/556,431

(22) Filed: Dec. 1, 2014

(65) Prior Publication Data

US 2015/0087234 A1 Mar. 26, 2015

Related U.S. Application Data

(62) Division of application No. 13/533,186, filed on Jun. 26, 2012, now Pat. No. 8,923,767.

(30) Foreign Application Priority Data

Jun. 28, 2011 (JP) .................................. 2011-142833

(51) Int. Cl.
*H04B 7/00* (2006.01)
*H04B 7/26* (2006.01)
(Continued)

(52) U.S. Cl.
CPC ............... *H04B 7/26* (2013.01); *H04M 1/6091* (2013.01); *H04W 4/008* (2013.01)

(58) Field of Classification Search
CPC ....................................................... H04W 4/046
USPC .............. 455/41.1, 41.2, 550.1, 556.1, 569.2, 455/575.9
See application file for complete search history.

(56) References Cited

U.S. PATENT DOCUMENTS

| 8,370,535 B2* | 2/2013 | Hahn et al. ....................... 710/11 |
| 2010/0210317 A1 | 8/2010 | Kakechi |
| 2011/0184784 A1* | 7/2011 | Rudow et al. ................. 705/7.38 |

FOREIGN PATENT DOCUMENTS

| JP | 2001-197560 | 7/2001 |
| JP | 2003-115918 | 4/2003 |

(Continued)

OTHER PUBLICATIONS

Office Action dated Jun. 4, 2013 in corresponding JP Application No. 2011-142833 with English translation.

(Continued)

*Primary Examiner* — Tuan H Nguyen
(74) *Attorney, Agent, or Firm* — Harness, Dickey & Pierce, PLC (57) ABSTRACT

A vehicular communication system includes: a vehicular communication apparatus; and a portable terminal apparatus. The vehicular communication apparatus includes: a vehicular storage device that stores a predetermined vehicular application for a predetermined function; and a vehicular input device that enters an operation for the predetermined function. The portable terminal apparatus includes: a mobile storage device that stores a predetermined mobile application for the predetermined function; a mobile input device that enters an operation for the predetermined function; an interoperation detection device that detects establishment of an interoperation state, in which the predetermined vehicular application and the predetermined mobile application interoperate with each other; and an operation input disable device that prevents the mobile input device from entering the operation when the interoperation detection device detects the establishment of the interoperation state.

5 Claims, 3 Drawing Sheets

(51) Int. Cl.
*H04M 1/60* (2006.01)
*H04W 4/00* (2009.01)

(56) References Cited

FOREIGN PATENT DOCUMENTS

| | | |
|---|---|---|
| JP | 2009-049678 | 3/2009 |
| JP | 2009-206866 | 9/2009 |
| JP | 2010-130670 | 6/2010 |
| JP | 2010-187287 | 8/2010 |
| JP | 2010-199718 | 9/2010 |
| JP | 2010-239283 | 10/2010 |

OTHER PUBLICATIONS

Office Action dated Dec. 3, 2013 in corresponding Chinese Application No. 201210223864.1 with English translation.
Office Action dated Aug. 19, 2014 in corresponding Chinese Application No. 201210223864.0 with English translation.
Office action dated Jan. 6, 2015 in corresponding Japanese Application No. 2014-035309.

* cited by examiner

VEHICULAR COMMUNICATION SYSTEM, VEHICULAR COMMUNICATION APPARATUS AND PORTABLE TERMINAL APPARATUS

CROSS REFERENCE TO RELATED APPLICATION

This application is a divisional of U.S. patent application Ser. No. 13/533,186 filed on Jun. 26, 2012. This application is based on Japanese Patent Application No. 2011-142833 filed on Jun. 28, 2011, the disclosure of which is incorporated herein by reference.

TECHNICAL FIELD

The present disclosure relates to a vehicular communication system, a vehicular communication apparatus, and a portable terminal apparatus. The vehicular communication system includes the vehicular communication apparatus mounted on a vehicle and the portable terminal apparatus communicably connected to the vehicular communication apparatus. The vehicular communication apparatus and the portable terminal apparatus configure the vehicular communication system.

BACKGROUND

Conventionally, there has been proposed the technology that mounts a vehicle with a communication apparatus having the short range communication function and establishes a communication line between the vehicular communication apparatus and a portable terminal apparatus such as a mobile telephone carried into a vehicle compartment. As disclosed in patent document 1, for example, such type of communication line is represented as a Bluetooth (registered trademark) communication line and provides communication standards such as SPP (Serial Port Profile), HFP (Hands Free Profile), OPP (Object Push Profile), and PBAP (Phone Book Access Profile).

Patent Document 1: JP-A-2009-206866

Recently, there is a growing tendency to originate a configuration that allows an application running on the vehicular communication apparatus to interoperate with an application running on the portable terminal apparatus communicably connected to the vehicular communication apparatus. According to such a configuration, however, a driver might have difficulty in concentrating driving when the driver operates the application using the portable terminal apparatus.

SUMMARY

It is an object of the present disclosure to provide a vehicular communication system including a vehicular communication apparatus and a portable terminal apparatus capable of allowing an application running on the vehicular communication apparatus to safely interoperate with an application running on the portable terminal apparatus communicably connected to the vehicular communication apparatus.

According to a first aspect of the present disclosure, a vehicular communication system includes: a vehicular communication apparatus mounted on a vehicle; and a portable terminal apparatus communicably connected to the vehicular communication apparatus. The vehicular communication apparatus includes: a vehicular storage device that stores a predetermined vehicular application for executing a predetermined function; and a vehicular input device that enters an operation for the predetermined function. The portable terminal apparatus includes: a mobile storage device that stores a predetermined mobile application for executing the predetermined function; a mobile input device that enters an operation for the predetermined function; an interoperation detection device that detects establishment of an interoperation state, in which the predetermined vehicular application and the predetermined mobile application interoperate with each other so that the predetermined function is executed; and an operation input disable device that prevents the mobile input device from entering the operation for the predetermined function when the interoperation detection device detects the establishment of the interoperation state.

In the above system, the vehicular communication apparatus and the portable terminal apparatus are communicably connected to each other to establish the interoperation state. The interoperation state enables interoperation between the specific application stored in the vehicular communication apparatus and the specific application stored in the portable terminal apparatus. Establishing the interoperation state restricts or inhibits the portable terminal apparatus from entering operations for the interoperation function the interoperation application implements. It is possible to ensure safe interoperation between the application performed in the vehicular communication apparatus and the application performed in the portable terminal apparatus communicably connected to the vehicular communication apparatus.

According to a second aspect of the present disclosure, a vehicular communication apparatus is mounted on a vehicle and configures the vehicular communication system according to the first aspect. In this case, it is possible to ensure safe interoperation between the application performed in the vehicular communication apparatus and the application performed in the portable terminal apparatus communicably connected to the vehicular communication apparatus.

According to a third aspect of the present disclosure, a portable terminal apparatus is communicably connected to a vehicular communication apparatus mounted on a vehicle and configures the vehicular communication system according to the first aspect. In this case, it is possible to ensure safe interoperation between the application performed in the vehicular communication apparatus and the application performed in the portable terminal apparatus communicably connected to the vehicular communication apparatus.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

An embodiment of the present disclosure will be described in further detail with reference to the accompanying drawings. The embodiment assumes the following. The vehicular communication apparatus is mounted in a vehicle compartment. The Bluetooth (trademark, hereinafter referred to as BT) communication function is used as a short range wireless communication function. A BT-compliant mobile telephone (hereinafter referred to simply as a mobile telephone) provided with the BT communication function is carried into the vehicle compartment. The vehicular communication apparatus is capable of BT communication (short range wireless communication) with the mobile telephone. Obviously, the vehicular communication apparatus also has the BT communication function and is therefore compliant with BT.

Figure 1:
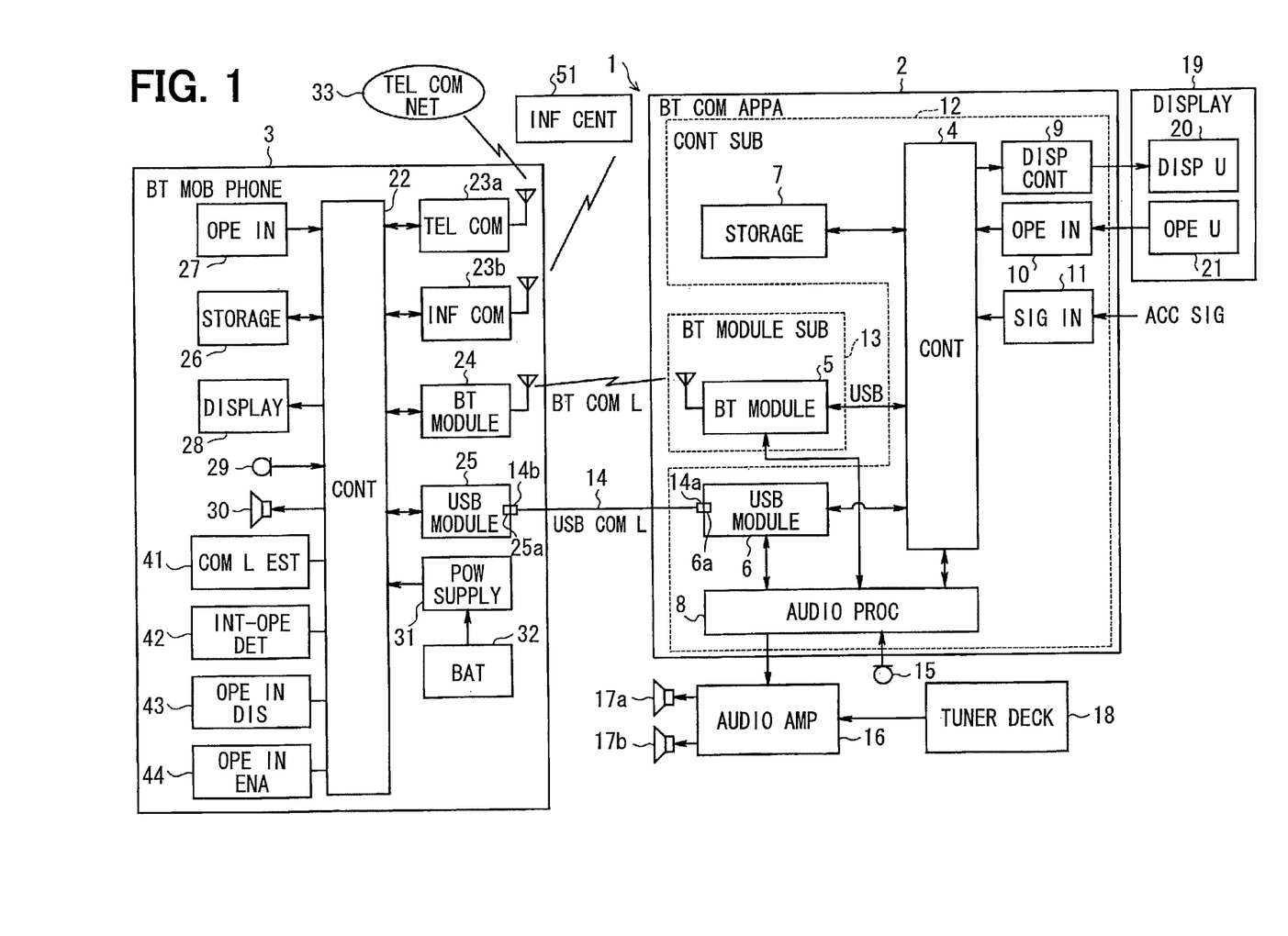
FIG. 1 is a block diagram showing a system of an embodiment of the present disclosure.

The BT communication system 1 includes a vehicular communication apparatus 2 mounted on a vehicle and a mobile telephone 3 carried into the vehicle compartment. The BT communication system 1 is equivalent to the vehicular communication system of the present disclosure. The mobile telephone 3 is equivalent to the portable terminal apparatus thereof.

The vehicular communication apparatus 2 includes a control portion 4, a BT module 5, a USB (Universal Serial Bus) module 6, a vehicular storage portion 7, an audio processing portion 8, a display control portion 9, a vehicular operation input portion 10, and a signal input portion 11. The control portion 4, the USB module 6, the vehicular storage portion 7, the audio processing portion 8, the display control portion 9, the vehicular operation input portion 10, and the signal input portion 11 are physically mounted on a control substrate 12. The BT module 5 is physically mounted on a BT module substrate 13 that is provided as a member different from the control substrate 12. The control portion 4 and the BT module 5 each has a USB interface and are connected to each other through a USB communication line.

The control portion 4 is provided as a known computer including a CPU, RAM, ROM, and an I/O bus. The control portion 4 controls overall operations such as communication operations and data management operations for the vehicular communication apparatus 2.

The BT module 5 has a function that performs BT communication with a BT module of the mobile telephone 3 (to be described) through a BT communication line. The BT module 5 can simultaneously connect multiple profiles specified in the BT communication standard so as to be capable of multi-connection. The profiles signify communication protocols defined for the corresponding functions. For example, the profiles include: SPP (Serial Port Profile) that specifies data communication available for virtual serial ports; HFP (Hands Free Profile) that specifies hands-free conversation; PBAP (Phone Book Access Profile) that specifies phone book data transfer; OPP (Object Push Profile) that also specifies phone book data transfer; A2DP (Advanced Audio Distribution Profile) that specifies audio data transfer; AVRCP (Audio/Video Remote Control Profile) that specifies transfer of control data concerning audio data control; DUN (Dial-up Networking Profile) that specifies dial-up connection to the Internet; and MAP (Message Access Profile) that specifies e-mail data. The BT module 5 and the BT module of the mobile telephone 3 (to be described) can exchange various information with each other using the BT communication line.

The USB module 6 has a connection terminal 6a attachable to and detachable from one connection terminal 14a of a USB connection cable 14. Let us suppose that one connection terminal 14a of the USB connection cable is connected to the connection terminal 6a and the other connection terminal 14b of the USB connection cable is connected to a USB module connection terminal of the mobile telephone 3 (to be described). In this state, the USB module 6 connects the USB communication line as a short range communication line with the USB module of the mobile telephone 3 and enables USB communication using the USB communication line. The USB module 6 and the USB module of the mobile telephone 3 (to be described) can exchange various data with each other using the USB communication line.

The vehicular storage portion 7 is configured as a non-volatile storage medium such as a hard disk drive and includes a storage area that stores various data. The vehicular storage portion 7 stores an interoperation application to implement an interoperation function (to be described in detail) as a specific application to implement a predetermined function. The vehicular storage portion 7 is equivalent to a vehicular storage means of the present disclosure.

The audio processing portion 8 connects with a microphone 15 that is provided in the vehicle compartment and is positioned near a steering unit where the voice uttered from a user can be easily collected, for example. The audio processing portion 8 also connects with an audio amplifier 16 provided outside the vehicular communication apparatus 2. The audio amplifier 16 connects with speakers 17a and 17b.

Let us suppose that the BT communication line is connected between the BT module 5 and the BT module of the mobile telephone 3 (to be described). In this state, when the microphone 15 inputs the voice uttered from the user as transmission voice data, the audio processing portion 8 processes the input transmission voice data and outputs the processed data to the BT module 5. When the BT module 5 inputs reception voice data, the audio processing portion 8 outputs the input reception voice data to the audio amplifier 16.

The audio amplifier 16 is supplied with the reception voice data or audio data from the audio processing portion 8. The audio amplifier 16 then amplifies the supplied reception voice data or audio data and outputs it from the speakers 17a and 17b. The audio amplifier 16 also connects with a tuner deck 18. The tuner deck 18 supplies music sound reproduced from a music recording medium or a radio program received from a radio broadcasting station. The audio amplifier 16 amplifies the supplied music sound or radio program and outputs it from the speakers 17a and 17b.

A display apparatus 19 includes a display unit 20 and an operation unit 21. The display unit 20 displays various display screens. The operation unit 21 forms a touch switch on the display screen. When supplied with a display instruction signal from the control portion 4, the display control portion 9 controls display operations of the display unit 20 in the display apparatus 19 based on the supplied display instruction signal. The vehicular operation input portion 10 is supplied with an operation detection signal from the operation unit 21 when a user operates a touch switch formed on the display screen. The vehicular operation input portion 10 outputs the supplied operation detection signal to the control portion 4. The control portion 4 analyzes the operation detection signal supplied from the vehicular operation input portion 10 and specifies the user operation. The vehicular operation input portion 10 allows an operation to input the interoperation function implemented by the above-mentioned interoperation application as a specific application. The vehicular operation input portion 10 is equivalent to a vehicular input means of the present disclosure. For example, operations for the interoperation function include starting or terminating the interoperation function, selecting contents interoperating with the interoperation function, and configuring various settings needed to implement the interoperation function.

The signal input portion 11 is connected to an ACC (accessory) switch mounted on the vehicle. The signal input portion 11 is supplied with an ACC signal supplied from the ACC switch and outputs the supplied ACC signal to the control portion 4. The control portion 4 turns on or off the apparatus power supply based on the ACC signal supplied from the signal input portion 11. That is, the control portion 4 turns on the apparatus power supply to start the vehicular communication apparatus 2 when the ACC signal changes from the off-state to the on-state. The control portion 4 turns off the apparatus power supply to stop the vehicular communication apparatus 2 when the ACC signal changes from the on-state to the off-state.

The following describes the configuration of the mobile telephone 3. The mobile telephone 3 includes a control portion 22, a telephone communication portion 23a, an information communication portion 23b, a BT module 24, a USB module 25, a mobile storage portion 26, a mobile operation input portion 27, a display portion 28, a microphone 29, a speaker 30, and a power supply portion 31.

The control portion 22 includes a CPU, RAM, ROM, and an I/O bus used for a known microcomputer. The control portion 22 controls overall operations such as a communication operation and a data management operation of the mobile telephone 3. The control portion 22 executes a control program in the CPU to virtually implement a communication line establishment portion 41, an interoperation detection portion 42, an operation input disable portion 43, and an operation input enable portion 44 as software. The interoperation detection portion 42 is equivalent to an interoperation detection means of the present disclosure. The operation input disable portion 43 is equivalent to an operation input disable means thereof. The operation input enable portion 44 is equivalent to an operation input enable means thereof.

The telephone communication portion 23a performs telephone communication with a telephone communication network 33. The telephone communication network 33 includes facilities such as a mobile telephone base station and a base station control apparatus that provide known mobile telephone communication services.

The information communication portion 23b performs various types of information communication with an external information center 51 via a wide area communication network, for example. The information center 51 stores the most recent version of the information. The mobile telephone 3 can acquire or download various information from the information center 51 via the information communication portion 23b. In this case, the information the mobile telephone 3 acquires from the information center 51 contains various types of application data and content data.

The BT module 24 has a function that performs BT communication with the BT module 5 of the vehicular communication apparatus 2 via the BT communication line. The BT module 24 can simultaneously connect with multiple profiles compliant with the BT communication standard.

The USB module 25 includes a connection terminal 25a attachable to and detachable from the other connection terminal 14b of the USB connection cable 14. Let us suppose that one connection terminal 14a of the USB connection cable 14 is connected to the connection terminal 6a of the USB module 6 and the other connection terminal 14b of the USB connection cable 14 is connected to the connection terminal 25a. In this state, the USB module 25 connects the USB communication line with the USB module 6 of the vehicular communication apparatus 2 and performs USB communication using the USB communication line.

The mobile storage portion 26 includes a storage area that stores various data. The mobile storage portion 26 stores the interoperation application (to be described later in detail) to implement the interoperation function as a specific application that implements a predetermined function. The mobile storage portion 26 is equivalent to a mobile storage means of the present disclosure. The mobile storage portion 26 of the mobile telephone 3 preferably uses a non-volatile storage medium but may use a volatile storage medium.

The mobile operation input portion 27 is provided with an operation unit including various keys and touch switches formed on a screen displayed on the display portion 28 so that a user can operate them. The mobile operation input portion 27 outputs an operation detection signal to the control portion 22 in response to a user operation on the key or the touch switch. The control portion 22 analyzes the operation detection signal supplied from the mobile operation input portion 27 and specifies the user operation. The mobile operation input portion 27 allows an operation to input the interoperation function the above-mentioned interoperation application as a specific application implements. The mobile operation input portion 27 is equivalent to a mobile input means of the present disclosure.

Figure 2A:
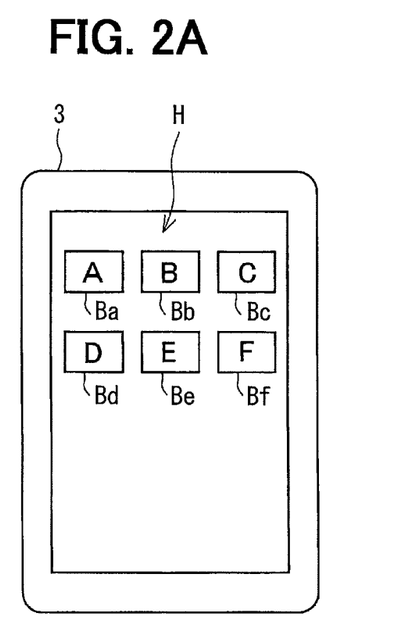
FIG. 2A is a front view of a mobile telephone showing a home screen.
Figure 2B:
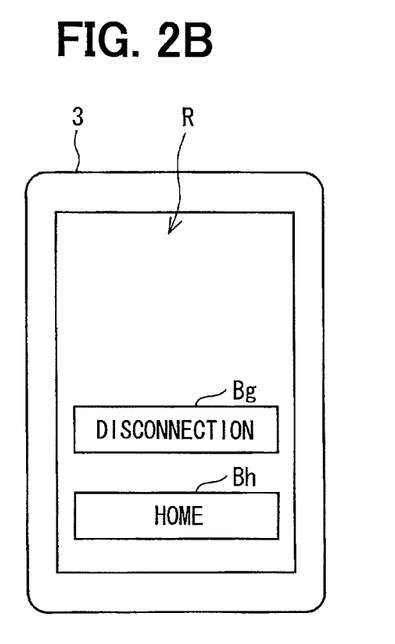
FIG. 2B is a front view of the mobile telephone showing an operation input restriction screen.

The display portion 28 includes a display unit such as a display device. The display portion 28 is supplied with a display instruction signal from the control portion 22 and displays various display screens based on the supplied display instruction signal. In this case, the control portion 22 can allow the display portion 28 to display various screens such as a home screen H as shown in FIG. 2A and an operation input restriction screen R as shown in FIG. 2B.

The home screen H is provided with operation buttons Ba through Bf for operating contents A through F. The above-mentioned interoperation application can perform the contents based on interoperation between the vehicular communication apparatus 2 and the mobile telephone 3. Though not shown, the home screen H can be provided with an operation button for operating an application other than the interoperation application, that is, an application except contents A through F the interoperation application can perform. Any application other than the interoperation application can be configured in accordance with specifications of the mobile telephone 3, for example.

The operation input restriction screen R is provided with a disconnection button Bg and a home button Bh. The disconnection button Bg frees or disconnects a short range communication line established between the vehicular communication apparatus 2 and the mobile telephone 3. The home button Bh changes the operation input restriction screen R to the home screen H. An area of the operation input restriction screen R except the disconnection button Bg and the home button Bh disables the touch operation and might be dimmed, for example.

The home screen H is displayed when the mobile telephone 3 operates in normal mode. Alternatively, the home screen H is displayed when the home button Bh is pressed on the operation input restriction screen R that is displayed on the mobile telephone 3 in operation restriction mode. The normal mode is enabled for the mobile telephone 3 that is not communicably connected to the vehicular communication apparatus 2. The normal mode enables unlimited ordinary operations of an application installed in the mobile telephone 3. The mobile telephone 3 can independently perform contents A through F included in the interoperation application when the mobile telephone is not communicably connected to the vehicular communication apparatus 2.

The microphone 29 inputs the voice uttered from a user as transmission voice. When the telephone communication portion 23a receives the voice from an intended party, the speaker 30 outputs the voice as reception voice. The power supply portion 31 supplies the power discharged from a battery 32 as operating power to respective function blocks. The battery 32 is attachable to and detachable from the mobile telephone body.

As described above, the USB communication line is connected between the USB modules 6 and 25 and the BT communication line is connected between the BT modules 5 and 24. In this state, the mobile telephone 3 as a communication party of the vehicular communication apparatus 2 uses the USB communication line and the BT communication line as multiple resources for transmitting various types of data to the vehicular communication apparatus 2. In this case, the mobile telephone 3 receives a command from the vehicular communication apparatus 2 that requests the mobile telephone 3 to start outputting various types of data. The mobile telephone 3 then uses any one of the USB communication line and the BT communication line as resources to transmit various types of data to the vehicular communication apparatus 2.

The communication line establishment portion 41 uses the BT module 24 to perform a process that establishes the BT communication line as a wireless short range communication line to the BT module 5 of the vehicular communication apparatus 2. The communication line establishment portion 41 uses the USB module 25 to perform a process that establishes the USB communication line as a wired short range communication line to the USB module 6 of the vehicular communication apparatus 2.

When connected to each other through the communication line, the vehicular communication apparatus 2 and the mobile telephone 3 implement the interoperation function. This function allows the vehicular communication apparatus 2 and the mobile telephone 3 to interoperate with each other while each of them performs the interoperation application installed as the specific application. For example, an application performed on the vehicular communication apparatus 2 can be output from the display portion 28 or the speaker 30 of the mobile telephone 3. By contrast, an application performed on the mobile telephone 3 can be output from the display device 19 or the speakers 17a and 17b of the vehicular communication apparatus 2.

The interoperation detection portion 42 detects that an interoperation state is established while the vehicular communication apparatus 2 and the mobile telephone 3 interoperate with each other. The interoperation state ensures interoperation between the interoperation application stored in the vehicular storage portion 7 of the vehicular communication apparatus 2 and the interoperation application stored in the mobile storage portion 26 of the mobile telephone 3.

The interoperation detection portion 42 detects that an interoperation state is established as described above. After that, the operation input disable portion 43 inhibits or restricts the mobile operation input portion 27 of the mobile telephone 3 as to operations for the interoperation function of the interoperation application.

The operation input enable portion 44 releases an operation input disable state in which the operation input disable portion 43 inhibits the mobile operation input portion 27 of the mobile telephone 3 from operating the interoperation function of the interoperation application. Specifically, as shown in FIG. 2B, the operation input enable portion 44 displays the disconnection button Bg so as to be operable on the screen of the display portion 28 when the BT or USB communication line is established between the vehicular communication apparatus 2 and the mobile telephone 3 to enable the connection capable of short range communication therebetween. Operating the disconnection button Bg disconnects the connection using SPP, for example, one of profiles established between the vehicular communication apparatus 2 and the mobile telephone 3. This releases the operation input disable state activated between the vehicular communication apparatus 2 and the mobile telephone 3.

Figure 3:
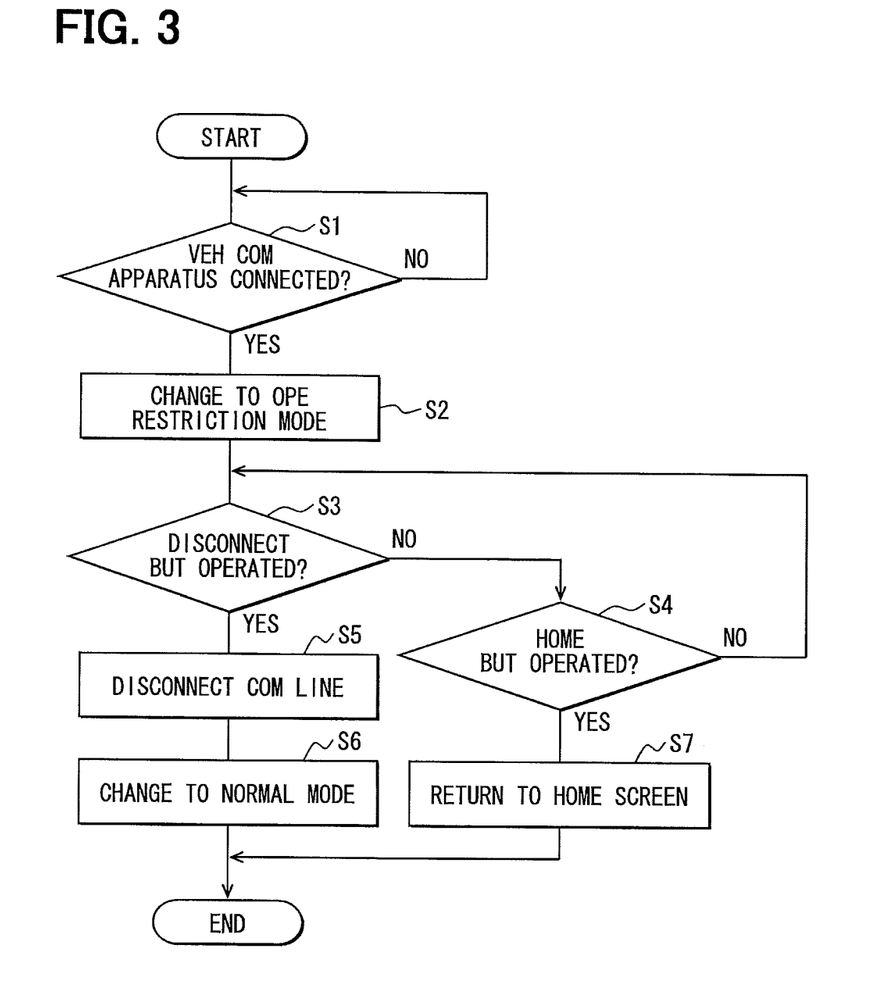
FIG. 3 is a flowchart showing operations of the mobile telephone.

With reference to FIG. 3, the following describes operations of the above-mentioned configuration. FIG. 3 shows operations of the mobile telephone 3 in the BT communication system 1. The following describes the restriction on operations of the mobile telephone 3 that can interoperate with the vehicular communication apparatus.

The control portion 22 of the mobile telephone 3 monitors whether the mobile telephone 3 is connected to the vehicular communication apparatus 2 so as to be capable of short range communication. That is, the control portion 22 monitors whether the interoperation state is established to enable interoperation between the interoperation application stored in the vehicular storage portion 7 of the vehicular communication apparatus 2 and the interoperation application stored in the mobile storage portion 26 of the mobile telephone 3 (step S1). In this case, the control portion 22 determines that the mobile telephone is connected to the vehicular communication apparatus 2 so as to be capable of short range communication via the BT communication line under the condition that the SPP connection is established.

The profile SPP can indicate a communication correspondent apparatus when the connection is established. Based on the SPP, one apparatus, i.e., the mobile telephone 3 issues a connection request. In response to the request, the other apparatus as a communication correspondent apparatus, i.e., the vehicular communication apparatus 2 configures a virtual serial port. The vehicular communication apparatus 2 notifies information indicating itself to the mobile telephone 3 as an origin of the connection request. The information is referred to as communication correspondent information equivalent to a signal "spp (vehicular communication apparatus 2)," for example. The control portion 22 of the mobile telephone 3 is notified of the communication correspondent information. Based on this information, the control portion 22 confirms that the communication correspondent apparatus is equivalent to the vehicular communication apparatus 2. The control portion 22 establishes SPP connection with the communication correspondent apparatus. Based on the communication correspondent information in the SPP, the mobile telephone 3 can determine whether the vehicular communication apparatus 2 functions as a communication correspondent apparatus for the BT communication when the BT communication line is established between the mobile telephone 3 and the vehicular communication apparatus 2. According to the embodiment, the control portion 22 of the mobile telephone uses the SPP function and determines whether the SPP connection is established and accordingly determines whether the mobile telephone 3 is communicably connected to the vehicular communication apparatus 2.

Concerning the USB communication line, there may be a case where the USB connection cable 14 is physically connected to the USB module 25 or the vehicular communication apparatus 2 as a connection party is detected via the USB connection cable, for example. Under such a condition, the control portion 22 can determine that the mobile telephone 3 is connected to the vehicular communication apparatus 2 through the USB communication line so as to be capable of the short range communication.

The BT or USB communication line is established between the vehicular communication apparatus 2 and the mobile telephone 3 when the mobile telephone 3 is communicably connected to the vehicular communication apparatus 2. The interoperation state may be established to enable interoperation between the interoperation application stored in the vehicular storage portion 7 of the vehicular communication apparatus 2 and the interoperation application stored in the mobile storage portion 26 of the mobile telephone 3 (YES at step S1). In this case, the control portion 22 changes the mobile telephone 3 to the operation restriction mode (step S2). In the operation restriction mode, as described above, the mobile telephone 3 displays the operation input restriction screen R that allows operations of the disconnection button Bg and the home button Bh only. The control portion 22 comes to be inoperable and restricts all the contents A through F the interoperation application should be able to perform.

After the mobile telephone changes to the operation restriction mode, the control portion 22 monitors whether the disconnection button Bg is pressed on the operation input restriction screen R (step S3). The control portion 22 monitors whether the home button Bh is pressed on the operation input restriction screen R (step S4).

When the disconnection button Bg is operated (YES at step S3), the control portion 22 releases the connection state capable of the short range communication with the vehicular communication apparatus 2. That is, the control portion 22 especially disconnects the SPP short range communication line established between the mobile telephone 3 and the vehicular communication apparatus 2 (step S5). The control portion 22 changes the mobile telephone 3 to the normal mode (step S6). The mobile telephone 3 displays the home screen H. The mobile telephone 3 is ready to operate all the contents A through F the interoperation application should be able to perform.

The home button Bh may be operated in the operation restriction mode (NO at step S3 and YES at step S4). In this case, the control portion 22 changes the operation input restriction screen R to the home screen H (step S7). The mobile telephone 3 is ready to operate applications that are performed on the vehicular communication apparatus 2 and are not associated with the contents A through F the interoperation application can perform. In this case, the home screen H may be preferably displayed differently from the normal mode. For example, the operation buttons Ba through Bf shown in FIG. 2A may be dimmed and disabled for operations because these buttons are associated with the contents A through F and are targeted for the operation restriction. Though not shown, there may be an operable button that is associated with the other applications and is therefore activated.

According to the embodiment, as described above, the vehicular communication apparatus 2 mounted on a vehicle allows the vehicular storage portion 7 to store the interoperation application that implements the interoperation function. The vehicular operation input portion 10 enables operations for the interoperation function of the interoperation application. The mobile telephone 3 is communicably connected to the vehicular communication apparatus 2. The mobile telephone 3 allows the mobile storage portion 26 to store the interoperation application that implements the interoperation function. The mobile operation input portion 27 enables operations for the interoperation function of the interoperation application. The mobile telephone allows the interoperation detection portion 42 to detect that the interoperation state is established. The interoperation state enables interoperation between the interoperation application stored in the vehicular storage portion 7 of the vehicular communication apparatus 2 and the interoperation application stored in the mobile storage portion 26 of the mobile telephone 3. The mobile telephone then allows the operation input disable portion 43 to inhibit operations for the interoperation function from the mobile operation input portion 27 of the mobile telephone 3.

The vehicular communication apparatus 2 and the mobile telephone 3 are communicably connected to each other to establish the interoperation state that allows interoperation between the interoperation application stored in the vehicular communication apparatus 2 and the interoperation application stored in the mobile telephone 3. Establishing the interoperation state restricts or inhibits the mobile telephone 3 from entering operations for the interoperation function the interoperation application implements. It is possible to ensure safe interoperation between the application performed in the vehicular communication apparatus 2 and the application performed in the mobile telephone 3 communicably connected to the vehicular communication apparatus 2.

According to the embodiment, the control portion 22 of the mobile telephone 3 can allow the operation input enable portion 44 to release the operation input disable state that inhibits the mobile operation input portion 27 from entering an operation for the interoperation function.

The operation input disable state inhibits the mobile telephone 3 from entering operations for the interoperation function the interoperation application implements. A user can release the operation input disable state as needed using the disconnection button Bg displayed on the operation input enable portion 44. While the vehicle stops, for example, the user can release the operation input disable state and operate the interoperation application from the mobile telephone 3.

When the operation input enable portion 44 releases the operation input disable state, the mobile telephone 3 may release the interoperation state that enables interoperation between a specific application stored in the vehicular storage portion 7 of the vehicular communication apparatus 2 and a specific application stored in the mobile storage portion 26 of the mobile telephone 3. Subsequently, the mobile telephone 3 itself may allow the mobile operation input portion 27 of the mobile telephone 3 to enable operations for the specific application stored in the mobile storage portion 26 of the mobile telephone 3.

The operation input disable state is released for the purpose of improving the usability and eliminating excessively restrictive use so that the mobile telephone 3 is ready for operation only when the user can safely operate the mobile telephone 3 while the vehicle stops, for example. Releasing the operation input disable state is not intended to allow the use of the mobile telephone 3 when the user needs to concentrate on the driving while the vehicle is running.

Even in the operation input disable state, pressing the home button Bh (YES at step S4) allows the control portion 22 of the mobile telephone 3 according to the embodiment to perform an application other than the interoperation application.

According to the embodiment, only the interoperation application can be defined as a specific application that needs to be prevented against operations. Applications other than the specific application need not be prevented against operations. The mobile telephone 3 can enter operations for these applications without restriction regardless of whether a communication line is established. That is, the mobile telephone 3 can be allowed to enter operations for only minimal applications.

As described in the embodiment, the vehicular communication apparatus 2 and the mobile telephone 3 are communicably connected to each other in accordance with multiple profiles. The mobile telephone 3 allows the operation input enable portion 44 to disconnect the connection based on SPP, a specific one of the profiles, and release the operation input disable state.

According to the embodiment, the SPP communication standard can indicate a communication correspondent apparatus when the connection is established. Using SPP, the control portion 22 of the mobile telephone 3 allows the communication line establishment portion 41 to establish a communication line with the vehicular communication apparatus 2. When the communication line is established for the vehicular communication apparatus 2, the control portion 22 of the mobile telephone 3 uses SPP to confirm that the communication correspondent apparatus corresponds to the vehicular communication apparatus 2. The control portion 22 then allows the operation input disable portion 43 to restrict entry of operations for the interoperation function of the interoperation application.

The mobile telephone 3 may communicate with a communication correspondent apparatus equal to the vehicular communication apparatus 2. In this case, the mobile telephone 3 can be inhibited from operating a specific application performed on the vehicular communication apparatus 2. The mobile telephone 3 may communicate with a communication correspondent apparatus such as a navigation system different from the vehicular communication apparatus 2. In this case, the mobile telephone 3 can operate a specific application performed on the apparatus. That is, the mobile telephone 3 can be inhibited from operating the specific application performed on the vehicular communication apparatus 2 when the mobile telephone is connected to the vehicular communication apparatus 2 as the communication correspondent apparatus so as to be capable of short range communication.

The present disclosure is not limited to the above-mentioned embodiment but is applicable to various embodiments within the spirit and scope of the present disclosure. For example, the present disclosure can be modified or enhanced as follows.

The specific application is not limited to the interoperation application.

A communication standard other than SPP may be used to determine connection to the communication correspondent apparatus at step S1.

The portable terminal apparatus is not limited to the mobile telephone but may be applicable to various mobile communication terminals.

The vehicular communication apparatus 2 may include a wireless apparatus attachable to and detachable from the vehicle as well as an onboard apparatus built into the vehicle.

The short range communication described in the embodiment is assumed to cover the distance in an ordinary vehicle compartment. A range of distances can be changed in accordance with various factors such as vehicle types, sizes, the communication performance of the vehicular communication apparatus 2, and that of the mobile telephone 3. The communication function appropriate for the range of distances can be used.

The above disclosure has the following aspects.

According to a first aspect of the present disclosure, a vehicular communication system includes: a vehicular communication apparatus mounted on a vehicle; and a portable terminal apparatus communicably connected to the vehicular communication apparatus. The vehicular communication apparatus includes: a vehicular storage device that stores a predetermined vehicular application for executing a predetermined function; and a vehicular input device that enters an operation for the predetermined function. The portable terminal apparatus includes: a mobile storage device that stores a predetermined mobile application for executing the predetermined function; a mobile input device that enters an operation for the predetermined function; an interoperation detection device that detects establishment of an interoperation state, in which the predetermined vehicular application and the predetermined mobile application interoperate with each other so that the predetermined function is executed; and an operation input disable device that prevents the mobile input device from entering the operation for the predetermined function when the interoperation detection device detects the establishment of the interoperation state.

In the above system, the vehicular communication apparatus and the portable terminal apparatus are communicably connected to each other to establish the interoperation state. The interoperation state enables interoperation between the specific application stored in the vehicular communication apparatus and the specific application stored in the portable terminal apparatus. Establishing the interoperation state restricts or inhibits the portable terminal apparatus from entering operations for the interoperation function the interoperation application implements. It is possible to ensure safe interoperation between the application performed in the vehicular communication apparatus and the application performed in the portable terminal apparatus communicably connected to the vehicular communication apparatus.

Alternatively, the portable terminal apparatus may further include: an operation input enable device that releases an operation input disable state activated by the operation input disable device. In the operation input disable state, the operation input disable device prevents the mobile input device from entering the operation for the predetermined function. In this case, the operation input enable device can release the operation input disable state that prevents the portable terminal apparatus from entering an operation for the predetermined function implemented by the specific application. While the vehicle stops, for example, a user can release the operation input disable state.

Further, when the operation input enable device releases the operation input disable state, the portable terminal apparatus may release the interoperation state that allows interoperation between the predetermined vehicular application and the predetermined mobile application. The mobile input device enables entry of an operation for the predetermined mobile application.

Alternatively, the portable terminal apparatus may allow an operation of an application other than the predetermined mobile application in an operation input disable state. In the operation input disable state, the operation input disable device prevents the mobile input device from entering the operation for the predetermined function. In this case, the specific application may be defined as only an application that requires restriction on operation input. The portable terminal apparatus can ensure unlimited entry of operations for an application other than the specific application, that is, an application that requires no restriction on operation input. That is, the portable terminal apparatus can be allowed to enter operations for only minimal applications.

Further, the vehicular communication apparatus and the portable terminal apparatus may be communicably connected to each other in accordance with a plurality of communication standards. The operation input enable device releases the operation input disable state by disconnecting connection in accordance with a predetermined one of the communication standards.

Alternatively, the portable terminal apparatus may be communicably connected to the vehicular communication apparatus in accordance with a communication standard, which provides to indicate a communication correspondent apparatus when connection is established. The operation input disable device prevents the mobile input device from entering the operation for the predetermined function after the operation input disable device confirms in accordance with the communication standard that the communication correspondent apparatus for the portable terminal apparatus is the vehicular communication apparatus. The portable terminal apparatus may communicate with a communication correspondent apparatus equal to the vehicular communication apparatus. In this case, the portable terminal apparatus can be inhibited from operating a specific application performed on the portable terminal apparatus. The portable terminal apparatus may communicate with a communication correspondent apparatus different from the vehicular communication apparatus. In this case, the portable terminal apparatus can operate a specific application performed on the apparatus. That is, the portable terminal apparatus can be inhibited from operating the specific application when the portable terminal apparatus is communicably connected to the vehicular communication apparatus as the communication correspondent apparatus.

Alternatively, when the interoperation detection device detects the establishment of the interoperation state, the vehicular input device may enter the operation for the predetermined function so that the predetermined function is executed.

Alternatively, the portable terminal apparatus may further include: a selection device for selecting one of the interoperation state and release of the interoperation state. When the selection device selects the release of the interoperation state, the portable terminal apparatus releases an operation input disable state activated by the operation input disable device. In the operation input disable state, the operation input disable device prevents the mobile input device from entering the operation for the predetermined function.

Alternatively, when the operation input enable device releases an operation input disable state, the mobile input device may enter the operation for the predetermined function so that the predetermine function is executed.

According to a second aspect of the present disclosure, a vehicular communication apparatus is mounted on a vehicle and configures the vehicular communication system according to the first aspect. In this case, it is possible to ensure safe interoperation between the application performed in the vehicular communication apparatus and the application performed in the portable terminal apparatus communicably connected to the vehicular communication apparatus.

According to a third aspect of the present disclosure, a portable terminal apparatus is communicably connected to a vehicular communication apparatus mounted on a vehicle and configures the vehicular communication system according to the first aspect. In this case, it is possible to ensure safe interoperation between the application performed in the vehicular communication apparatus and the application performed in the portable terminal apparatus communicably connected to the vehicular communication apparatus.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A non-transitory computer readable storage medium comprising instructions for execution by a computer, the instructions including a computer-implemented method for executing a predetermined application in a portable terminal apparatus in a vehicular communication system, which includes: a vehicular communication apparatus mounted on a vehicle; and the portable terminal apparatus executing the predetermined application and having a display, wherein the vehicular communication apparatus and the portable terminal apparatus communicate and interoperate with each other so that the vehicular communication apparatus outputs a plurality of contents obtained by the portable terminal apparatus, the instructions including:
   displaying a home screen, which includes a plurality of operation buttons for outputting the plurality of contents;
   determining whether the vehicular communication apparatus and the portable terminal apparatus are connected to each other; and
   displaying an operation input restriction screen for restricting an operation of each operation button when the vehicular communication apparatus and the portable terminal apparatus are connected;
   wherein the instruction further includes: displaying the home screen when the vehicular communication apparatus and the portable terminal apparatus are disconnected.

2. The non-transitory computer readable storage medium according to claim 1,
   wherein the portable terminal apparatus independently outputs the plurality of contents when the vehicular communication apparatus and the portable terminal apparatus are disconnected.

3. A vehicular communication system comprising:
   a vehicular communication apparatus mounted on a vehicle; and
   a portable terminal apparatus communicably connected to the vehicular communication apparatus,
   wherein the vehicular communication apparatus includes:
   a vehicular storage device that stores a predetermined vehicular application for executing a predetermined function; and
   a vehicular input device that enters an operation for the predetermined function,
   wherein the portable terminal apparatus includes:
   a mobile storage device that stores a predetermined mobile application for executing the predetermined function, the predetermined mobile application providing a function for displaying a home screen, which includes a plurality of operation buttons for outputting the plurality of contents;
   a mobile input device that operates the plurality of operation buttons;
   an interoperation detection device that detects establishment of an interoperation state, in which the predetermined vehicular application and the predetermined mobile application interoperate with each other; and
   an operation input disable device that prevents the mobile input device from entering an operation for the operation buttons on the home screen when the interoperation detection device detects the establishment of the interoperation state;
   wherein the portable terminal apparatus displays the home screen when the establishment of the interoperation state is released.

4. A vehicular communication system comprising:
   a vehicular communication apparatus mounted on a vehicle; and
   a portable terminal apparatus communicably connected to the vehicular communication apparatus,
   wherein the vehicular communication apparatus includes:
   a vehicular storage device that stores a predetermined vehicular application for executing a predetermined function; and a vehicular input device that enters an operation for the predetermined function,
wherein the portable terminal apparatus includes:
a mobile storage device that stores a predetermined mobile application for executing the predetermined function, the predetermined mobile application providing a function for displaying a home screen, which includes a plurality of operation buttons for outputting the plurality of contents;
a mobile input device that operates the plurality of operation buttons;
an interoperation detection device that detects establishment of an interoperation state, in which the predetermined vehicular application and the predetermined mobile application interoperate with each other; and
an operation input disable device that prevents the mobile input device from entering an operation for the operation buttons on the home screen when the interoperation detection device detects the establishment of the interoperation state;
wherein the portable terminal apparatus independently outputs the plurality of contents when the vehicular communication apparatus and the portable terminal apparatus are disconnected.

5. A non-transitory computer readable storage medium comprising instructions for execution by a computer, the instructions including a computer-implemented method for executing a predetermined application in a portable terminal apparatus in a vehicular communication system, which includes: a vehicular communication apparatus mounted on a vehicle; and the portable terminal apparatus executing the predetermined application and having a display, wherein the vehicular communication apparatus and the portable terminal apparatus communicate and interoperate with each other so that the vehicular communication apparatus outputs a plurality of contents obtained by the portable terminal apparatus, the instructions including:
 displaying a home screen, which includes a plurality of operation buttons for outputting the plurality of contents;
 determining whether the vehicular communication apparatus and the portable terminal apparatus are connected to each other; and
 displaying an operation input restriction screen for restricting an operation of each operation button when the vehicular communication apparatus and the portable terminal apparatus are connected;
 wherein the portable terminal apparatus independently outputs the plurality of contents when the vehicular communication apparatus and the portable terminal apparatus are disconnected.

* * * * *